United States Patent
Mitchell et al.

(10) Patent No.: US 9,242,630 B2
(45) Date of Patent: Jan. 26, 2016

(54) METHOD AND APPARATUS FOR CONTROLLING A TORQUE CONVERTER CLUTCH IN A MULTI-MODE POWERTRAIN SYSTEM

(71) Applicant: GM GLOBAL TECHNOLOGY OPERATIONS LLC, Detroit, MI (US)

(72) Inventors: John S. Mitchell, Farmington Hills, MI (US); Jeremy V. Horgan, Northville, MI (US); Christopher E. Whitney, Commerce, MI (US); Scott A. Hearld, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 39 days.

(21) Appl. No.: 14/165,668

(22) Filed: Jan. 28, 2014

(65) Prior Publication Data
US 2015/0210262 A1 Jul. 30, 2015

(51) Int. Cl.
  *B60W 10/02* (2006.01)
  *B60W 10/06* (2006.01)
  *B60W 10/08* (2006.01)
  *B60K 6/485* (2007.10)

(52) U.S. Cl.
  CPC .............. *B60W 10/023* (2013.01); *B60K 6/485* (2013.01); *B60W 10/026* (2013.01); *B60W 10/06* (2013.01); *B60W 10/08* (2013.01); *B60W 2510/0241* (2013.01); *B60W 2510/0657* (2013.01); *B60W 2510/083* (2013.01); *B60W 2540/12* (2013.01); *B60W 2710/025* (2013.01); *B60W 2710/0666* (2013.01); *B60W 2710/083* (2013.01); *Y10S 903/902* (2013.01)

(58) Field of Classification Search
  CPC ..... B60W 10/04; B60W 10/06; B60W 10/08; B60W 10/023
  USPC ............................................................ 701/22
  See application file for complete search history.

(56) References Cited

U.S. PATENT DOCUMENTS

| | | | |
|---|---|---|---|
| 4,582,185 A | 4/1986 | Grimes et al. | |
| 5,029,087 A * | 7/1991 | Cowan et al. | 701/68 |
| 6,928,357 B2 * | 8/2005 | Higashimata et al. | 701/87 |
| 7,513,851 B2 * | 4/2009 | Sieffert et al. | 477/176 |
| 8,348,036 B2 * | 1/2013 | Ari et al. | 192/3.3 |
| 2009/0014269 A1 | 1/2009 | Ari et al. | |
| 2013/0296103 A1 * | 11/2013 | Dai et al. | 477/5 |
| 2013/0296130 A1 * | 11/2013 | Banker et al. | 477/27 |

* cited by examiner

*Primary Examiner* — Mary Cheung
*Assistant Examiner* — Michael Berns

(57) ABSTRACT

A powertrain system includes an internal combustion engine rotatably coupled to a non-combustion torque machine and a torque converter which is rotatably coupled to an input member of a transmission. A method for operating the powertrain system includes operating the torque converter in a controlled slip operating state and controlling a torque converter clutch capacity in response to a driver requested braking torque. Target torque outputs from the engine and from the torque machine are determined in response to the driver requested braking torque subjected to a time delay. A torque modifier for the torque machine is determined in response to a torque converter clutch slip error. Torque output from the engine is controlled in response to the target torque output from the engine, and torque output from the torque machine is controlled in response to the target torque output and the torque modifier from the torque machine.

14 Claims, 4 Drawing Sheets

METHOD AND APPARATUS FOR CONTROLLING A TORQUE CONVERTER CLUTCH IN A MULTI-MODE POWERTRAIN SYSTEM

TECHNICAL FIELD

This disclosure is related to vehicle operation, including controlling multi-mode powertrain systems.

BACKGROUND

The statements in this section merely provide background information related to the present disclosure and may not constitute prior art.

Vehicles employ powertrain systems to generate tractive torque for vehicle propulsion. Powertrain systems may transmit torque originating from multiple torque generative devices, e.g., an engine and one or more non-combustion torque machines, through a transmission device to an output member coupled to a driveline. Control systems for operating such powertrain systems operate the torque-generative devices and apply torque transfer elements in the transmission to transfer torque in response to operator-commanded output torque requests, taking into account fuel economy, emissions, driveability, and other factors. The non-combustion torque machines may include electric machines that are operative as motors or generators to provide a torque input to the transmission independently of a torque input from the internal combustion engine. The torque machines transform vehicle kinetic energy, transferred through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A powertrain system includes an internal combustion engine rotatably coupled to a non-combustion torque machine and a torque converter which is rotatably coupled to an input member of a transmission. A method for operating the powertrain system includes operating the torque converter in a controlled slip operating state and controlling a torque converter clutch capacity in response to a driver requested braking torque. Target torque outputs from the engine and from the torque machine are determined in response to the driver requested braking torque subjected to a time delay. A torque modifier for the torque machine is determined in response to a torque converter clutch slip error. Torque output from the engine is controlled in response to the target torque output from the engine, and torque output from the torque machine is controlled in response to the target torque output and the torque modifier from the torque machine.

BRIEF DESCRIPTION OF THE DRAWINGS

One or more embodiments will now be described, by way of example, with reference to the accompanying drawings, in which.

DETAILED DESCRIPTION

Figure 1:
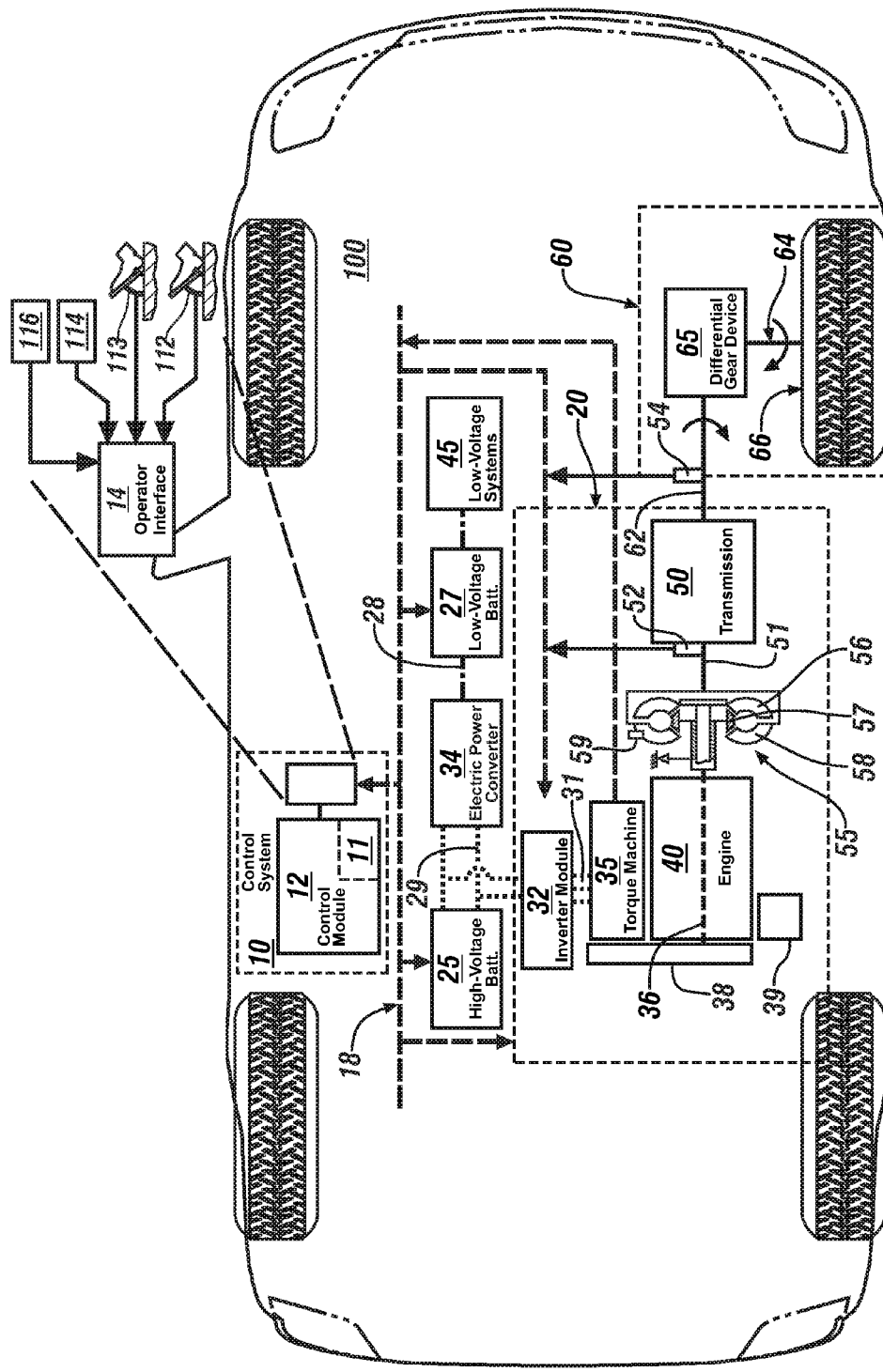
FIG. 1 illustrates a vehicle including a multi-mode powertrain system including a torque machine and an internal combustion engine that mechanically couples to a transmission via a torque converter, in accordance with the disclosure.

Referring now to the drawings, wherein the showings are for the purpose of illustrating certain exemplary embodiments only and not for the purpose of limiting the same, FIG. 1 schematically shows a vehicle 100 including a multi-mode powertrain system 20 coupled to a driveline 60 and controlled by a control system 10. Like numerals refer to like elements throughout the description. The multi-mode powertrain system 20 includes torque-generating devices including an internal combustion engine 40 and a non-combustion torque machine 35 that transfer torque through a transmission 50 to the driveline 60. The preferred configuration of the multi-mode powertrain system 20 includes the torque machine 35 rotatably mechanically coupled to a crankshaft 36 of the engine 40 that rotatably mechanically couples through a fluidic torque coupling device (torque converter) 55 to an input member 51 of the transmission 50. The crankshaft 36 mechanically rotatably couples to the torque machine 35 via a pulley mechanism 38. Other configurations of the multi-mode powertrain system 20 that include the torque machine 35 rotatably mechanically coupled to the engine 40 that mechanically couples to the transmission 50 by way of torque converter 55 may be employed within the scope of this disclosure.

The engine 40 is preferably a multi-cylinder internal combustion engine that converts fuel to mechanical torque through a thermodynamic combustion process. The engine 40 is equipped with a plurality of actuators and sensing devices for monitoring operation and delivering fuel to form a combustion charge to produce torque that is responsive to an operator torque request. The engine 40 is configured to execute autostart and autostop control schemes and fuel cut-off (FCO) control schemes during ongoing operation of the multi-mode powertrain system 20. The engine 40 is considered to be in an OFF state when it is not rotating. The engine 40 is considered to be in an ON state when it is rotating, including one or more FCO states in which it is spinning and unfueled.

The non-combustion torque machine 35 is an electrically-powered torque machine 35 that includes a high-voltage multi-phase electric motor/generator configured to convert stored electric energy to mechanical power and convert mechanical power to electric energy that may be stored in a high-voltage battery 25 in one embodiment. The torque machine 35 includes a rotor and a stator and an accompanying position sensor. In one embodiment, the electrically-powered torque machine 35 includes an output member that mechanically rotatably couples to the crankshaft 36 of the engine 40 via the pulley mechanism 38, which provides a mechanical power path therebetween. The pulley mechanism 38 is configured to effect torque transfer between the engine 40 and the torque machine 35, including torque transfer from the torque machine 35 to the engine 40 for engine autostart and autostop maneuvers, tractive torque assistance, torque transfer for regenerative vehicle braking, and torque transfer from engine 40 to the torque machine 35 for high-voltage electrical charging. In one embodiment, the pulley mechanism 38 includes a serpentine belt routed between a first pulley attached to the crankshaft 36 of the engine 40 and a second pulley attached to a rotating shaft coupled to a rotor of the torque machine 35, referred to as a belt-alternator-starter (BAS) system. Alternatively, the pulley mechanism 38 may include a positive-displacement gearing mechanism, or another suitable positive mechanical connection. The engine 40 may include a low-voltage solenoid-actuated electrical starter 39 for engine starting in response to a key-crank event.

The high-voltage battery 25 electrically connects to an inverter module 32 via a high-voltage DC bus 29 to transfer high-voltage electric power to the torque machine 35 in response to control signals originating in the control system 10. The inverter module 32 electrically connects to the torque machine 35 via a multi-phase motor control power bus 31. The inverter module 32 is configured with suitable control circuits including power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control to convert stored DC electric power originating in the high-voltage battery 25 to AC electric power to drive the torque machine 35 to generate torque. Similarly, the inverter module 32 converts mechanical power transferred to the torque machine 35 to DC electric power to generate electric energy that is storable in the high-voltage battery 25, including as part of a regenerative control strategy. The inverter module 32 is configured to receive motor control commands and control inverter states to provide the motor drive and regeneration functionality. In one embodiment, a DC/DC electric power converter 34 electrically connects to a low-voltage bus 28 and a low-voltage battery 27, and electrically connects to the high-voltage bus 29. Such electric power connections are known and not described in detail. The low-voltage battery 27 electrically connects to an auxiliary power system 26 to provide low-voltage electric power to low-voltage systems 45 on the vehicle, including, e.g., electric windows, HVAC fans, seats, and the low-voltage solenoid-actuated electrical starter 39.

The transmission 50 includes any suitable configuration that can operate in a neutral state wherein the input member 51 mechanically decouples from an output member 62. A first rotational position/speed sensor 52 monitors rotation of the input member 51 and a second rotational position/speed sensor 54 monitors rotation of the output member 62 of the transmission 50. As such, the first rotational position/speed sensor 52 also may be used to monitor rotational speed of a turbine 58 of the torque converter 55. Exemplary transmissions include, by way of example, an automatic transmission, a dual clutch transmission, a clutchless manual transmission and a manual transmission. The transmission 50 is configured to operate in one of a plurality of selectable fixed-gear operating modes to operate at a gear ratio that achieves a preferred match between an operator torque request and an engine operating point, and preferably employs one or a plurality of differential gear sets and hydraulically-activated clutches to effect torque transfer in one of a plurality of selectable operating modes over a range of speed ratios between the input member 51 and output member 62. The transmission 50 executes upshifts to shift to an operating mode having a lower numerical multiplication ratio (gear ratio) and executes downshifts to shift to an operating mode having a higher numerical multiplication ratio. A transmission upshift requires a reduction in engine speed so the engine speed matches transmission output speed multiplied by the gear ratio at a gear ratio associated with the target operating mode. A transmission downshift requires an increase in engine speed so the engine speed matches transmission output speed multiplied by the gear ratio at a gear ratio associated with the target operating mode.

The torque converter 55 is a two-pass fluidic torque coupling device in one embodiment that includes an impeller 56, a stator 57, turbine 58, and a controllable locking clutch 59. The turbine 58 rotatably couples to a transmission input member 51. The controllable locking clutch 59 interacts between the impeller 56 and the turbine 58, and is configured to operate in one of an unlocked state, a controlled slip state, and a locked state to manage relative rotation of the impeller 56 and the turbine 58. The controlled slip state is an operating state wherein the controllable locking clutch 59 is partially applied to transfer torque at a preferred magnitude of rotational slip between the impeller 56 and the turbine 58, with the magnitude of rotational slip controlled by controlling hydraulic pressure in the torque converter 55. The impeller 56 and stator 57 are configured to multiply torque transferred to the turbine 58 when the clutch 59 is in an unlocked condition. Other design features of a torque converter are known and not discussed in detail herein. Alternatively, the torque converter 55 can be a three-pass device. The torque converter 55 operates as an automatic clutch element to transfer torque between the engine 40 and the transmission 50. The torque converter 55 provides a mechanical buffer between the engine 40 and the transmission 50, acting to absorb torsional vibrations of the engine 40, transmission 50, and driveline 60. The torque converter 55 may also act to dampen variations in the engine speed under certain conditions including those associated with engine speed flaring during engine starting events and individual cylinder firing events at low engine speeds. Operation of the torque converter 55 may be characterized in terms of an input speed and input torque and an output speed and output torque. The torque converter input speed, i.e., the impeller speed $N_P$ is equal to the rotational speed of the engine 40. The input or impeller torque $T_P$ is the torque transferred from the engine 40 to the impeller 56. The torque converter output speed, i.e., the turbine speed $N_T$ is the rotational speed of the engine 40, and the output or turbine torque $T_T$ is equal to the engine torque when the torque converter clutch is locked. Two ratios of interest include a torque ratio $R_T$, which is a ratio between the turbine torque and the pump torque, i.e., $T_P/T_T$ and a speed ratio $R_s$, which is a ratio between the turbine speed $N_T$ and the pump speed $N_P$, i.e., $N_P/N_T$.

The driveline 60 may include a differential gear device 65 that mechanically couples to an axle 64, transaxle or halfshaft that mechanically couples to a wheel 66 in one embodiment. The driveline 60 transfers tractive power between the transmission 50 and a road surface.

The control system 10 includes control module 12 that signally connects to an operator interface 14. The control module 12 preferably includes a plurality of discrete devices that are co-located with the individual elements of the multi-mode powertrain system 20 to effect operational control of the individual elements of the multi-mode powertrain system 20 employing one or more control routines 11. The control module 12 may also include a control device that provides hierarchical control of other control devices. The control module 12 signally and operatively connects to each of the high-voltage battery 25, the inverter module 32, the torque machine 35, the engine 40, and the transmission 50 either directly or via a communications bus 18 to monitor operation and determine parametric states thereof. The operator interface 14 of the vehicle 100 is a controller that signally connects to a plurality of human/machine interface devices through which the vehicle operator commands operation of the vehicle 100. The human/machine interface devices include, e.g., an accelerator pedal 112, which provides a driver requested acceleration signal (APP); a brake pedal 113, which provides a driver requested braking signal (BPP); a transmission range selector 114, which provides a driver requested transmission range signal (PRNDL); and a vehicle speed cruise control system 116. Other human/machine interface devices preferably include an ignition switch to enable an operator to crank and start the engine 40, a steering wheel, and a headlamp switch. The accelerator pedal 112 provides signal input indicating an accelerator pedal position and the brake pedal 113 provides signal input indicating a brake pedal position. The transmission range selector 114 provides signal input indicating direction of operator-intended motion of the vehicle including a discrete number of operator-selectable positions indicating the preferred rotational direction of the output member 62 of either a forward or a reverse direction. It is appreciated that the vehicle may still move in a direction other than the indicated direction of operator-intended motion due to rollback caused by location of a vehicle, e.g., on a hill.

The multi-mode powertrain system 20 includes a communications scheme including the communications bus 18 to effect communications in the form of sensor signals and actuator command signals between the control system 10 and elements of the multi-mode powertrain system 20. The communications scheme employs one or more communications systems and devices, including, e.g., the communications bus 18, a direct connection, a local area network bus, a serial peripheral interface bus, and wireless communications to effect information transfer.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, example each 100 microseconds, 3.125, 6.25, 12.5, 25 and 100 milliseconds during ongoing engine and vehicle operation. Alternatively, routines may be executed in response to occurrence of an event.

Vehicle operation responsive to operator requests includes operating modes of accelerating, braking, coasting, and idling. The acceleration mode includes an operator request to increase vehicle speed. The braking mode includes an operator request to decrease vehicle speed, which can be accomplished with braking torque that originates from either or both friction braking from mechanical brake elements that are located at the vehicle wheels and reactive braking from the powertrain system through the driveline. The coasting mode includes vehicle operation wherein the vehicle is presently moving at a rate of speed with no operator request for either braking or accelerating, with the vehicle speed determined based upon the present vehicle speed and vehicle momentum, vehicle wind resistance and rolling resistance, and driveline inertial drag. The idle mode includes vehicle operation wherein vehicle speed is at or near zero with the transmission range selector in a non-propulsion range, or in one of the propulsion ranges with the operator request including zero input to the accelerator pedal and minimal or slight input to the brake pedal.

The controller executes one or more control routines to control elements of an embodiment of the multi-mode powertrain system described with reference to FIG. 1 to determine a driver requested braking torque, which is determined based upon the driver requested braking signal. The torque converter is controlled in a controlled slip operating state, including controlling torque converter clutch capacity to apply the torque converter clutch in a manner that is immediately responsive to a driver requested braking torque. The driver requested braking torque is also subjected to a time delay, and a target torque output for the engine and a target torque output for the torque machine are determined that are responsive to the time-delayed driver requested braking torque. A torque modifier for the torque machine is determined that is responsive to the torque converter clutch slip error. Torque output from the engine is controlled responsive to the target torque output for the engine, and torque output from the torque machine is controlled responsive to the target torque output and the torque modifier for the torque machine to effect powertrain braking while operating the torque converter in the controlled slip operating state. This operation is described in detail with reference to FIGS. 2 and 3.

Controlling the torque converter in a controlled slip operating state in response to driver requested braking isolates the vehicle and its passenger(s) from powertrain and driveline torque disturbances while permitting an overall broader operating speed range (i.e., lower minimum RPM) for the torque converter clutch with the engine fueled due to improved damping of torsional vibrations associated with combustion. Such operation may expand operating range at which regenerative braking can occur. Furthermore, such operation permits a relatively quick release of the torque converter clutch in response to aggressive braking maneuvers, thus preventing or reducing the likelihood that the rate of change in engine speed will not follow the rate of change in the transmission turbine speed. This operation prevents or reduces the likelihood of an engine stall during an aggressive braking maneuver.

Figure 2:
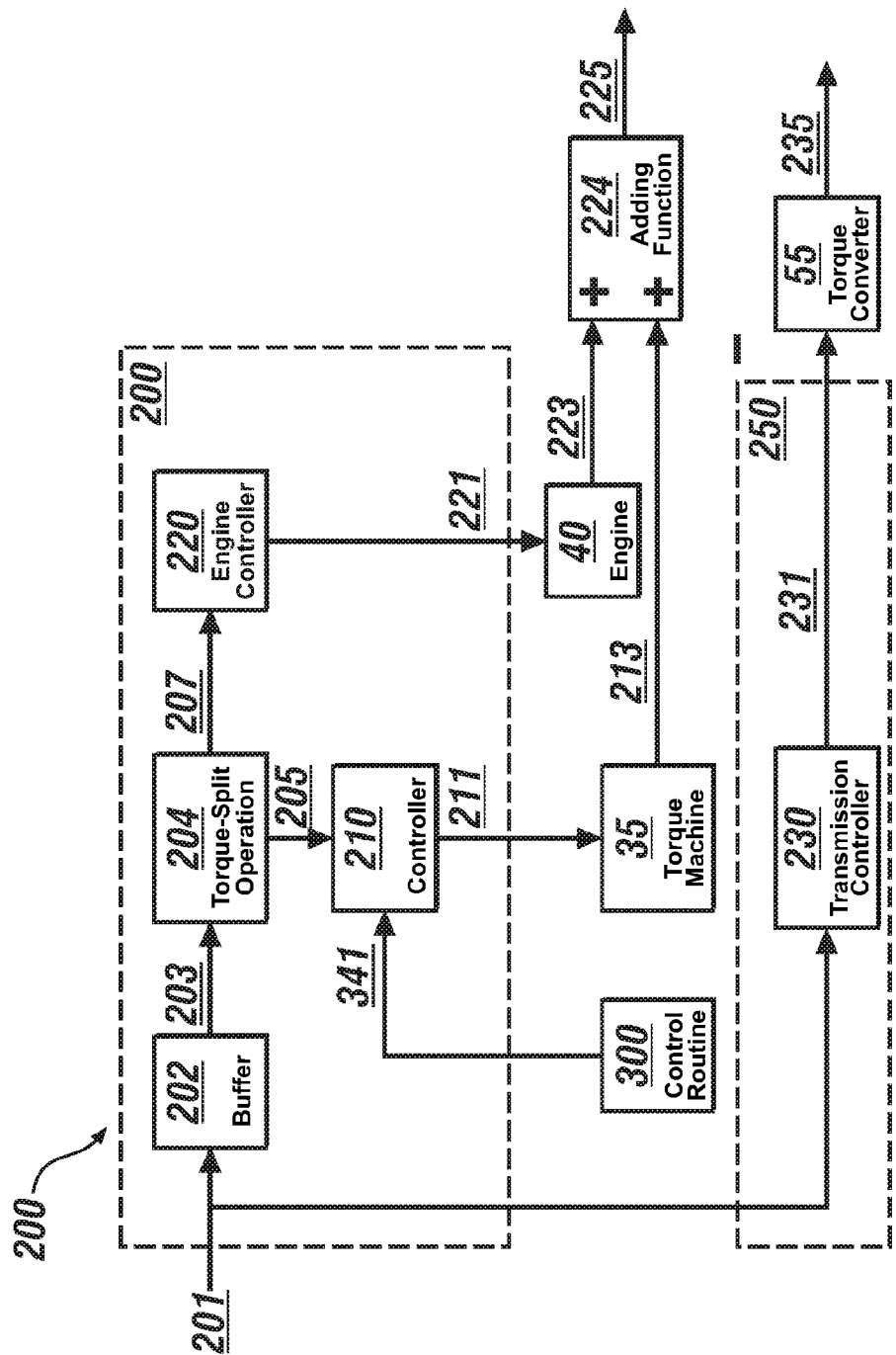
FIGS. 2 and 3 illustrates control routines for controlling elements of the multi-mode powertrain system in response to a driver requested braking torque including controlling the torque converter in a controlled slip operating state, in accordance with the disclosure.
Figure 3:
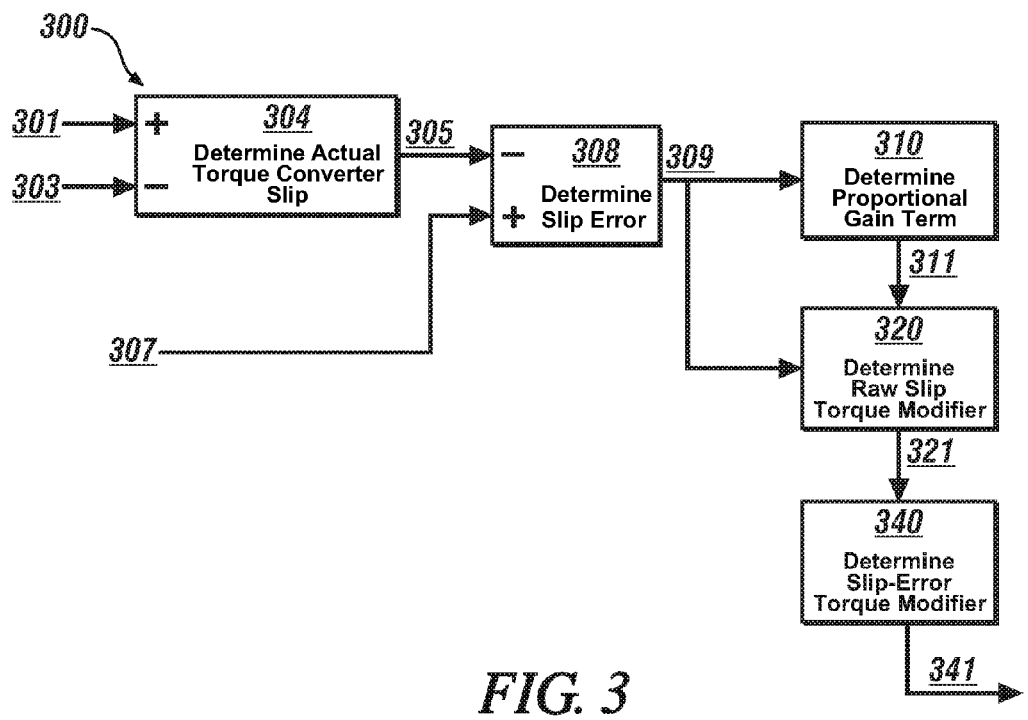

FIGS. 2 and 3 schematically show control routines for controlling elements of the multi-mode powertrain system 100 described with reference to FIG. 1 in response to a driver requested braking torque (DRBT), including controlling the torque converter in a controlled slip operating state. This includes controlling the combination of engine torque and machine torque to synchronize with the torque converter clutch response. Control routine 200 is a feed-forward hydraulic pressure compensation control routine wherein an immediate DRBT 201 is input to a buffer (202), which outputs a time-delayed DRBT 203. The time-delayed DRBT 203 preferably reflects the immediate DRBT 201 with an added time delay. The added time delay is preferably calibrated to match a response time delay in the torque capacity of the torque converter clutch, and thus is associated with a time delay between a commanded torque and actual torque of the torque converter clutch. The time-delayed DRBT 203 is input to a torque-split operation (204), which generates a target engine torque 207 and a target machine torque 205, the combination of which are responsive to the time-delayed DRBT 203. The target engine torque 207 is a target torque output from the engine, and the target machine torque 205 is a target torque output from the torque machine. The torque-split operation (204) can employ any suitable torque-split function that accounts for factors related to torque and power capabilities, system response times, fuel and power consumptions, and other factors to determine the target engine torque 207 and the target machine torque 205.

The target machine torque 205 is input to an MGU controller 210, which combines the target machine torque 205 with a slip-error torque modifier 341 to determine a commanded torque machine torque 211 with associated controller commands. A control routine 300 determines the slip-error torque modifier 341 for providing closed-loop control of the torque machine 35 based upon a target torque converter slip, with an embodiment described with reference to FIG. 3. The commanded torque machine torque 211 and associated controller commands are communicated to the torque machine 35, which generates an actual torque machine torque 213 that is responsive thereto. The actual torque machine torque 213 may vary from the commanded torque machine torque 211 due to factors related to signal transmission times, torque machine response times, and torque machine capabilities. The torque machine 35 operates as a fast-responding torque actuator under most circumstances. A fast-responding torque actuator is capable of achieving a commanded torque after a single loop cycle that generates and communicates the commanded torque.

The target engine torque 207 is input to an engine controller 220, which determines a commanded engine torque 221 with associated engine commands that are communicated to the engine 40. The engine 40 executes in response to the commanded engine torque 221, and generates an actual engine torque 223. The actual engine torque 223 may vary from the commanded engine torque 221 due to factors related to signal transmission times, engine response times, including, e.g., intake manifold fill times and engine capabilities. The engine 40 operates as a slow-responding torque actuator under most circumstances. A slow-responding torque actuator is capable of achieving a commanded torque after multiple loop cycles subsequent to generating and communicating the commanded torque due to the aforementioned factors. An adding function 224 arithmetically combines the actual engine torque 223 and the actual torque machine torque 213 to determine a total crankshaft torque 225.

Control routine 250 is a feed-forward control routine wherein the immediate DRBT 201 is input to a transmission controller 230 without delay or filtering. The transmission controller 230 generates a commanded torque converter hydraulic pressure 231 in response to the immediate DRBT 201. The commanded torque converter hydraulic pressure 231 is communicated to the torque converter 55, which operates in response, including generating an actual torque converter hydraulic pressure 235, also referred to as torque converter clutch capacity.

FIG. 3 shows an embodiment of the control routine 300 for determining the slip-error torque modifier 341 for providing closed-loop control of the torque machine based upon a target torque converter slip. A difference block 304 determines an actual torque converter slip 305, which is an arithmetic difference between a torque converter turbine rotational speed 301 and an engine rotational speed 303. A second difference block 308 determines a slip error 309, which is an arithmetic difference between the actual torque converter slip 305 and a target torque converter slip 307. The target torque converter slip 307 is determined as a function of turbine speed and crankshaft torque. The sign or direction of the target torque converter slip 307 changes with the sign of crankshaft torque, i.e., positive torque is positive slip and negative torque means negative slip. The target torque converter slip 307 generally has a small gradient with respect to turbine speed and torque, and is generally constant on two-pass torque converter systems because the slip control is only capable within +/−30 RPM. The slip error 309 is input to a gain function 310, which selects or otherwise determines a proportional gain term 311 based upon the magnitude and direction (i.e., positive or negative) of the slip error 309. The slip error 309 is modified by the proportional gain term 311, e.g., by a multiplicative function block 320, to determine a raw slip torque modifier 321. The raw slip torque modifier 321 is subjected to a clipping function 340 to determine the slip-error torque modifier 341. The clipping function 340 imposes limitations on the raw slip torque modifier 321 that are based upon system capabilities, which can include minimum and maximum torque capabilities of the torque machine, minimum and maximum battery power states, and other limitations. The slip-error torque modifier 341 is the raw slip torque modifier 321 that has been subjected to the aforementioned limitations, if necessary. Thus, when there is no slip error, i.e., the slip error 309 is zero, the slip-error torque modifier 341 is also zero and the target machine torque 205 becomes the commanded torque machine torque 211.

By generating the commanded torque converter hydraulic pressure 231 responsive to the immediate DRBT 201 and generating the commanded torque machine torque 211 and the commanded engine torque 221 responsive to the time-delayed DRBT 203, the actual total crankshaft torque 225 can increase in concert with the increase in the torque converter clutch capacity, i.e., the torque converter hydraulic pressure 235.

Figure 4:
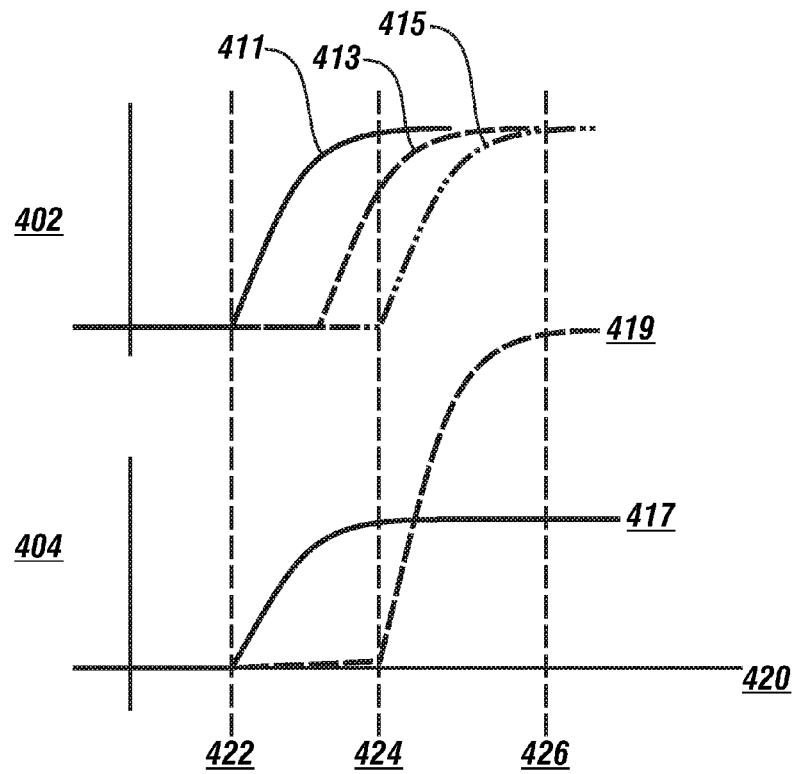
FIG. 4 illustrates a plurality of time-coincident torques and hydraulic pressures plotted in relation to time associated with the aforementioned control routines in response to a driver requested braking torque, in accordance with the disclosure.

FIG. 4 graphically shows a plurality of time-coincident torques 402 and hydraulic pressures 404 plotted in relation to time 420 for an embodiment of the multi-mode powertrain system of FIG. 1 executing the control routine of FIGS. 2 and 3. As shown, immediate DRBT 411 is zero prior to time point 422, at which time it increases, with a corresponding increase in a commanded torque converter clutch pressure 417. After a delay period, the time-delayed DRBT 413 begins to increase. At time point 424, torque converter clutch capacity 419 increases in response to the changes in the system operation coincident with a change in actual crankshaft torque 415, with the crankshaft torque 415 achieving the immediate DRBT 411 at time point 426. The time delay thus matches the response time delay associated with adjusting the torque converter clutch capacity 419, and use of the time delay permits synchronizing the torque converter clutch capacity 419 with the crankshaft torque 415. Such operation reduces or eliminates control issues related to overshoot, ringing and similar effects that cause torque instability that can lead to engine stalling or other adverse driveability issues.

Figure 5:
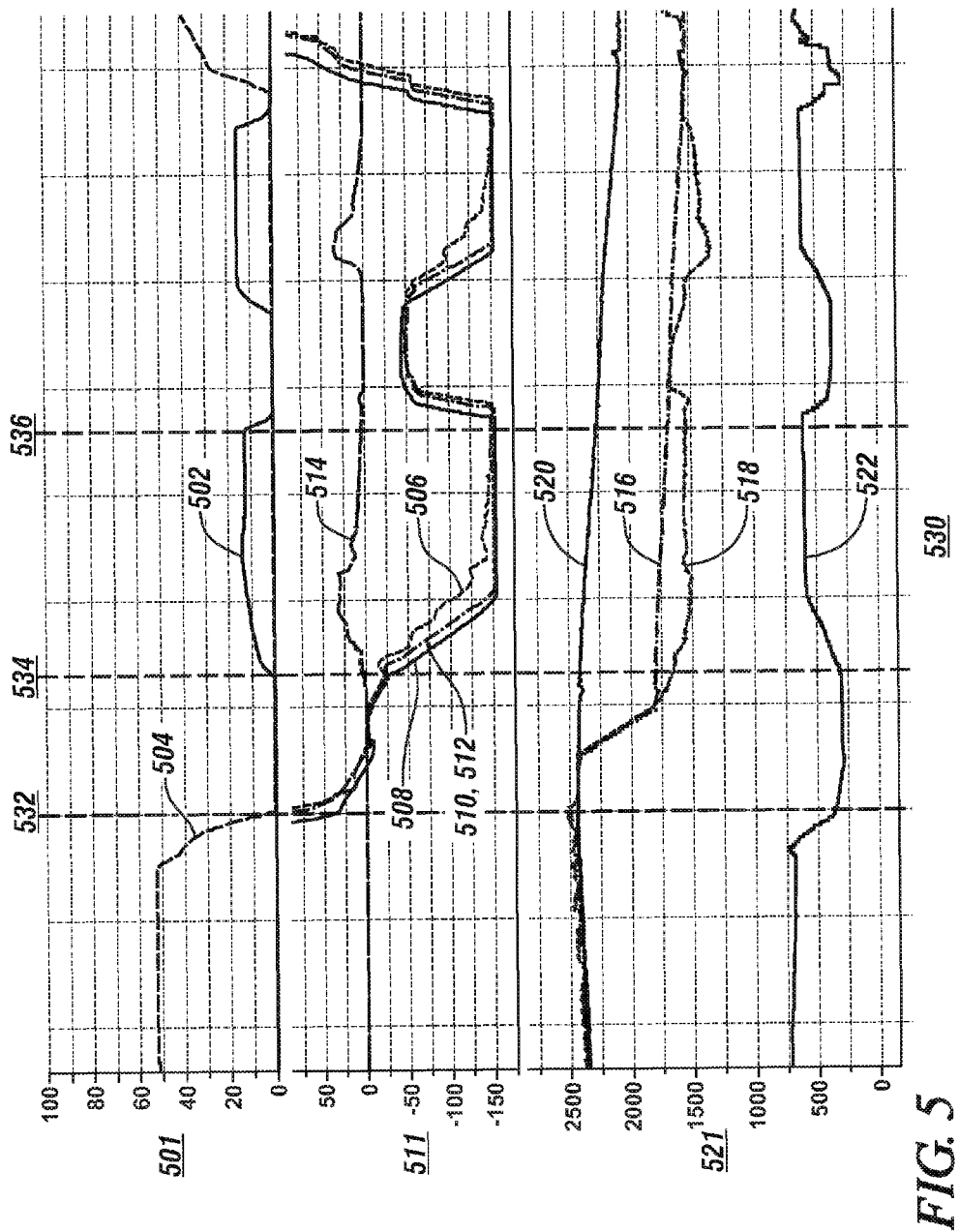
FIG. 5 illustrates a plurality of time-coincident operating parameters associated with operating an embodiment of the powertrain system employing the aforementioned control routines in response to a driver requested braking torque, including controlling the torque converter in a controlled slip operating state, in accordance with the disclosure.

FIG. 5 graphically shows a plurality of time-coincident operating parameters associated with operating an embodiment of the powertrain system described with reference to FIG. 1 employing an embodiment of the control routines for controlling elements of the powertrain system 100 described with reference to FIGS. 2 and 3 in response to a driver requested braking torque. This includes controlling the torque converter in a controlled slip operating state during braking. The operating parameters are plotted in relation to time 530, shown on the horizontal axis. A first set of the operating parameters includes driver inputs (in %) 501, including a driver requested braking signal (BPP) 502 and a driver requested acceleration signal (APP) 504. A second set of the parameters includes torques (in Nm) 511, including total actual crankshaft torque 506, a total driver demanded torque 508, including both acceleration and braking, a phase-shifted driver demanded torque 510, a phase-shifted torque command 512, and a torque converter slip-error based modifier 514. The total actual crankshaft torque 506 is a combination of torque from the engine and the torque machine. A third set of the parameters includes rotational speeds (RPM) 521, including torque converter turbine speed 516, engine speed 518 and transmission output speed 520. A commanded torque converter clutch pressure (kPa) 522 is also shown.

At time point 532, the driver requested acceleration signal (APP) 504 reduces to zero, indicating a vehicle coasting state. The torque converter clutch remains locked initially as indicated by the common states of the engine speed 518 and the turbine speed 516. The slip-error based modifier 514 is zero. When the engine speed 518 reaches about 1750 RPM, the torque converter clutch begins to open and the engine speed 518 diverges from the turbine speed 516. At time point 534, the driver applies the brake pedal, leading to an increase in the driver requested braking signal (BPP) 502 and an increase in the slip-error based modifier 514. Thus, after the driver applies the brake pedal, the immediate DRBT drops indicating the driver's desire for more braking torque. At this point the commanded torque converter clutch pressure 522 increases by an amount appropriate for the increase in torque. The engine torque and open loop motor torque are scheduled based on the delayed DRBT signal 510. The open loop strategy does not perfectly match the engine and torque machine torque response to the torque converter clutch as evidenced by the drop in engine speed 518. The closed loop torque modifier 514 corresponds to the slip-error torque modifier 341 shown with reference to FIG. 3, and is added to the delayed DRBT signal 510 to achieve the actual crankshaft torque 506, which is a combination of actual torques from the engine and torque machine.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating a powertrain system comprising an internal combustion engine rotatably coupled to a torque converter rotatably coupled to an input member of a transmission, said engine rotatably coupled to a non-combustion torque machine, the method comprising:
   operating the torque converter in a controlled slip operating state and controlling a torque converter clutch capacity in response to a commanded torque converter clutch capacity based immediately on a driver requested braking torque;
   determining a target torque output from the engine and a target torque output from the torque machine in response to the driver requested braking torque subjected to a time delay, said time delay calibrated to match a response time delay in the torque converter achieving the commanded torque converter clutch capacity following a change in the commanded torque converter clutch capacity;
   determining a torque modifier for the torque machine in response to a torque converter clutch slip error;
   controlling torque output from the engine in response to the target torque output from the engine; and
   controlling torque output from the torque machine in response to the target torque output and the torque modifier for the torque machine.

2. The method of claim 1, wherein the torque converter comprises a fluidic two-pass torque converter.

3. The method of claim 1, wherein controlling the torque converter clutch capacity comprises controlling a commanded torque converter clutch pressure to apply the torque converter clutch in response to the driver requested braking torque.

4. The method of claim 1, wherein controlling the torque converter clutch capacity comprises applying the torque converter clutch in a controlled slip state in response to the driver requested braking torque.

5. The method of claim 1, wherein determining the torque modifier for the torque machine comprises determining a torque modifier for the torque machine that is proportional to the torque converter clutch slip error.

6. The method of claim 1, wherein controlling torque output from the torque machine in response to the target torque output and the torque modifier for the torque machine effects powertrain braking while operating the torque converter in the controlled slip operating state.

7. The method of claim 1, wherein controlling torque output from the torque machine in response to the target torque output and the torque modifier for the torque machine effects powertrain braking via the transmission in response to the driver requested braking torque.

8. A method for operating elements of a powertrain system comprising an internal combustion engine, a non-combustion torque machine, and a fluidic two-pass torque converter, the method comprising:
   operating the torque converter in a controlled slip operating state and controlling a torque converter clutch capacity in response to a commanded torque converter clutch capacity based immediately on a driver requested braking torque;
   determining a target torque output from the engine and a target torque output from the torque machine in response to the driver requested braking torque subjected to a time delay, said time delay calibrated to match a response time delay in the torque converter achieving the commanded torque converter clutch capacity following a change in the commanded torque converter clutch capacity;
   determining a torque modifier for the torque machine in response to a torque converter clutch slip error;
   controlling torque output from the engine in response to the target torque output from the engine; and
   controlling torque output from the torque machine in response to the target torque output and the torque modifier for the torque machine in response to the driver requested braking torque.

9. The method of claim 8, wherein controlling torque output from the torque machine in response to the target torque output and the torque modifier for the torque machine effects powertrain braking in response to the driver requested braking torque.

10. The method of claim 8, wherein controlling the torque converter clutch capacity comprises controlling a commanded torque converter clutch pressure to apply the torque converter clutch in response to the driver requested braking torque.

11. The method of claim 8, wherein controlling the torque converter clutch capacity comprises applying the torque converter clutch in a controlled slip state in response to the driver requested braking torque.

12. The method of claim 8, wherein determining the torque modifier for the torque machine comprises determining a torque modifier for the torque machine that is proportional to the torque converter clutch slip error.

13. The method of claim 8, wherein controlling torque output from the torque machine in response to the target torque output and the torque modifier for the torque machine effects powertrain braking while operating the torque converter in the controlled slip operating state.

14. The method of claim 8, wherein controlling torque output from the torque machine in response to the target torque output and the torque modifier for the torque machine effects powertrain braking via the transmission in response to the driver requested braking torque.

\* \* \* \* \*